United States Patent
Wada et al.

[11] Patent Number: 5,596,904
[45] Date of Patent: Jan. 28, 1997

[54] STEERING GEAR APPARATUS OF RACK-AND-PINION TYPE

[75] Inventors: Yoshisada Wada, Okazaki; Takahiro Iwase, Anjo; Kunio Hayashi, Aichi-gun; Kazuhiko Tsuda, Nagoya; Shigemi Shioya, Okazaki; Yasushi Hayashida, Nishikamo-gun, all of Japan

[73] Assignee: Toyota Jidosha Kabushiki Kaisha, Aichi-ken, Japan

[21] Appl. No.: 441,939

[22] Filed: May 16, 1995

[30] Foreign Application Priority Data

May 17, 1994 [JP] Japan .................. 6-102982

[51] Int. Cl.$^6$ ................................ B62D 3/12
[52] U.S. Cl. .......................... 74/422; 74/458
[58] Field of Search ............. 74/422, 458, 498, 74/388 PS

[56] References Cited

U.S. PATENT DOCUMENTS

| | | | |
|---|---|---|---|
| 4,524,631 | 6/1985 | Cordiano | 74/422 |
| 4,539,857 | 9/1985 | Kako et al. | 74/422 |
| 4,890,683 | 1/1990 | Matsuda et al. | 74/422 |
| 5,058,448 | 10/1991 | Kiyooka et al. | 74/422 |
| 5,203,216 | 4/1993 | Hasegawa | 74/422 |
| 5,285,864 | 2/1994 | Martin et al. | 74/422 |

FOREIGN PATENT DOCUMENTS 60-80177  5/1985  Japan .
2-33171  2/1990  Japan .

*Primary Examiner*—Vinh T. Luong
*Assistant Examiner*—David Fenstermacher
*Attorney, Agent, or Firm*—Oliff & Berridge

[57] ABSTRACT

A steering gear apparatus of the rack-and-pinion type including a pinion formed with helical teeth and a rack member formed with helical teeth which are brought into meshing engagement with the helical teeth of the pinion in such a manner that a steering effort is applied to the meshed portion of the helical teeth of the pinion and rack member at a predetermined angle relative to an axis line of the rack member, the rack member being resiliently biased toward the pinion, wherein the helical teeth of the pinion or the rack member each are formed with a tip portion to be brought into engagement with each root of the helical teeth of the rack member or the pinion.

3 Claims, 5 Drawing Sheets

STEERING GEAR APPARATUS OF RACK-AND-PINION TYPE

BACKGROUND OF THE INVENTION

1. Field of the Invention

The present invention relates to a steering gear apparatus of the rack-and-pinion type adapted for use in a steering system of an automotive vehicle.

2. Description of the Prior Art

In a conventional steering gear apparatus of this kind, the toothed portion of the pinion is in the form of a helical gear, and the axis line of the pinion is inclined at a predetermined angle relative to the normal line of the rack member such that a steering effort is applied to the meshed portion of the toothed portions of the pinion and rack member at the predetermined angle relative to the axis line of the rack member. To eliminate looseness at the meshed portion, the rack member is resiliently supported by a rack guide which is carried by a spring member to bias the rack member toward the pinion.

In the conventional steering gear apparatus, as shown in FIG. 12, a tooth $1a$ (a helical toothed portion the tip circle radius of which is r2 and the pitch circle radius of which is r1) of a pinion 1 is disengaged from teeth $2a$ of a rack member 2 at its tip and root and is in sliding contact with the teeth $2a$ of rack member 2 at two flanks a and b in a tooth trace direction for effecting a wedge effect. In transmission of the steering effort at the meshed portion of the teeth $1a$ and $2a$, there will occur a frictional force due to sliding at the tooth flanks a and b, and the rack member 2 is slightly rotated about its axis line or deviated from its axis line due to a counterforce acting against the frictional force when applied with a rotational force from the pinion 1. (see FIGS. 9(A), 10(A) and 11(A)) This results in deterioration of the steering performance. The frictional force Fp caused by sliding at the tooth flanks a and b is determined by a biasing force of the spring member (not shown) for biasing the rack member 2 toward the pinion 1, a normal line force F1 (a force acting in a direction perpendicular to the engaged tooth flanks) defined by an angle θ (usually, 29°–40°) between the tooth flanks a and b and a frictional coefficient μ, as is represented by the following equation;

$$Fp = \mu \times F1 = (\mu \times Fo/2)/\sin(\theta/2);$$

Where Fo is a numerical representation of the biasing force of the spring member.

To improve such deterioration of the steering performance as described above, Japanese Utility Model Laid-open Publication No. 2-33171 discloses a steering gear apparatus wherein a rack member is provided with a rib portion for restriction of rotation, and wherein a housing containing the meshed portion of the rack member and a pinion is provided with a restriction means for engagement with the rib portion of the rack member to restrict rotation of the rack member in a condition where the rack member is slidable only in an axis line direction. In the steering gear apparatus, it is, however, required to provide a space for the rib portion and restriction means in the housing. As a result, the steering gear apparatus becomes large in size and heavy due to the provision of the rib portion and restriction means.

SUMMARY OF THE INVENTION

It is, therefore, a primary object of the present invention to provide an improved steering gear apparatus of the rack-and-pinion type capable of enhancing the steering performance without causing the problems discussed above.

According to an aspect of the present invention, the object is accomplished by providing a steering gear apparatus of the rack-and-pinion type including a pinion formed with a toothed portion, a rack member formed with a toothed portion which is brought into meshing engagement with the toothed portion of the pinion in such a manner that a steering effort is applied to the meshed portion of the toothed portions of the pinion and rack member at a predetermined angle relative to an axis line of the rack member, and resilient means for resiliently biasing the rack member toward the pinion, wherein each tooth of the toothed portion of the pinion or the rack member is formed with a tip portion to be brought into engagement with a root of each tooth of the toothed portion of the rack member or the pinion.

According to another aspect of the present invention, the object is accomplished by providing a steering gear apparatus of the rack-and-pinion type including a pinion formed with a toothed portion, a rack member formed with a toothed portion which is brought into meshing engagement with the toothed portion of the pinion in such a manner that a steering effort is applied to the meshed portion of the toothed portions of the pinion and rack member at a predetermined angle relative to an axis line of the rack member, and resilient means for resiliently biasing the rack member toward the pinion, wherein one of the toothed portions of the pinion and the rack member is formed larger in width than the other toothed portion, and wherein the other toothed portion smaller in width is formed in its full width with a plurality of teeth while the toothed portion larger in width is formed with the corresponding teeth in transcription for engagement with the teeth of the other toothed portion at least at their opposite ends in a tooth width direction.

BRIEF DESCRIPTION OF THE DRAWINGS

Other objects, features and advantages of the present invention will be more readily appreciated From the following detailed description of certain preferred embodiments thereof when taken together with the accompanying drawings, in which.

DESCRIPTION OF THE PREFERRED EMBODIMENTS

Figure 1:
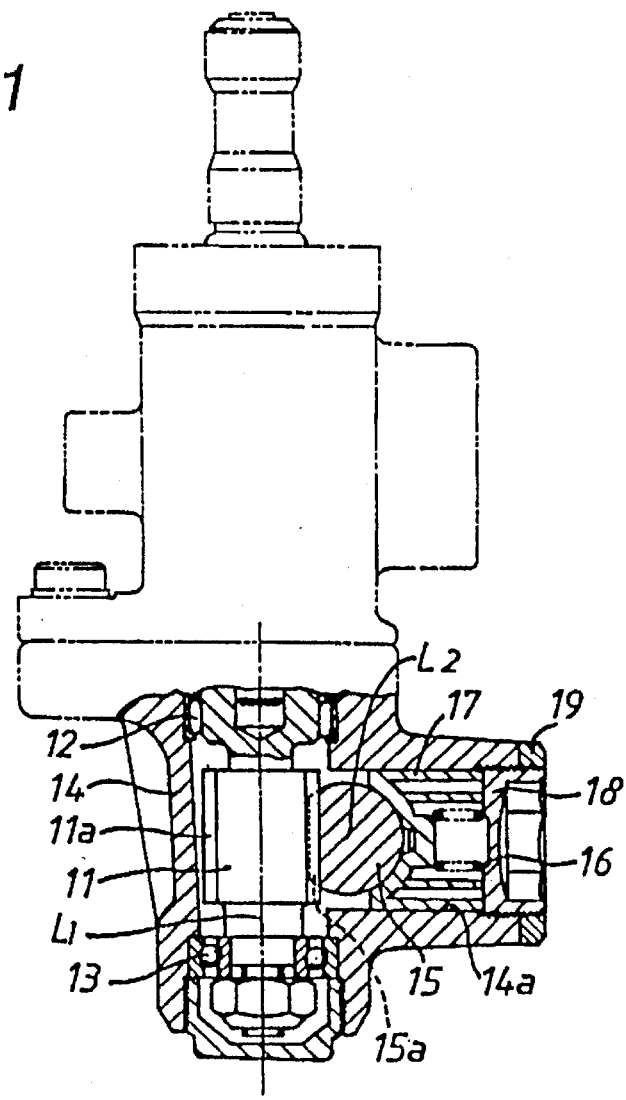
FIG. 1 is a partly sectional view of a steering gear apparatus in accordance with the present invention.

Illustrated in FIG. 1 of the drawings is an embodiment of a steering gear apparatus in accordance with the present invention, which includes a pinion 11 rotatably mounted in place within a gear housing 14 by means of a pair off axially spaced bearings 12 and 13. The pinion 11 is mounted within the gear housing 14 in such a manner that an axis line L1 of pinion 11 is inclined at a predetermined angle relative to a normal line (not shown) of an axis line L2 of a rack member 15 in the form of a lateral rod arranged to be translated. The pinion 11 is formed with helical teeth 11a which are brought into meshing engagement with helical teeth 15a formed on one side of the rack member 15 such that a steering effort is applied to the meshed portion of the helical teeth 11a, 15a at a predetermined angle relative to the axis line L2 of rack member 15. The rack member 15 is resiliently supported by a rack guide 17 which is carried by a spring member 18 to bias the rack member 15 toward the pinion 11. The spring member 18 is disposed between a closure cap 18 threaded into the housing 14 and the rack guide 17. The rack guide 17 is slidably mounted within a mounting hole 14a formed in the housing 14. The closure cap 18 acts as a spring receiver and as an element for defining a displacement amount of the rack guide 17 in a biasing direction of the spring member 16 and is locked to the housing 14 by means of a lock nut 19.

Figure 2:
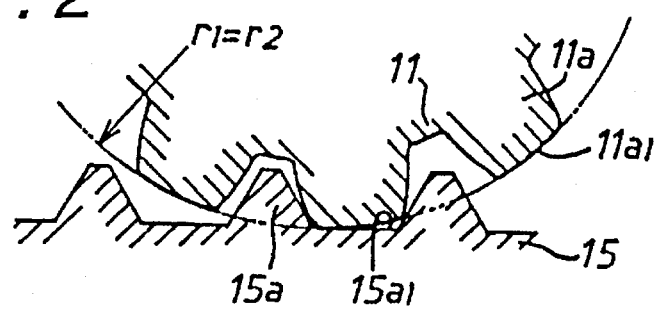
FIG. 2 is an enlarged sectional view of the meshed portion of a pinion and a rack member shown in FIG. 1.

As clearly shown in FIG. 2, the helical teeth 11a of pinion 11 are formed with a tip circle radius r2 which is the same as a pitch circle radius r1 of the helical teeth 11a. The teeth 15a of rack member 15 are formed in such a manner that each root 15a1 of the rack teeth 15a is in rolling contact with each tip portion 11a1 of the pinion teeth 11a in an axial direction of the rack member 15. At the meshed portion of the teeth 11a and 15a, the tip potion 11a1 of each of the pinion teeth 11a is constantly brought into contact with the root 15a1 of each of the rack teeth 15a in a tooth width direction. Thus, a frictional force Fp (Fp=μ×Fo) defined by a frictional coefficient μ at the meshed portion is obtainable by the biasing force Fo of spring member 16 in the axial direction of rack member 15.

Figure 9:
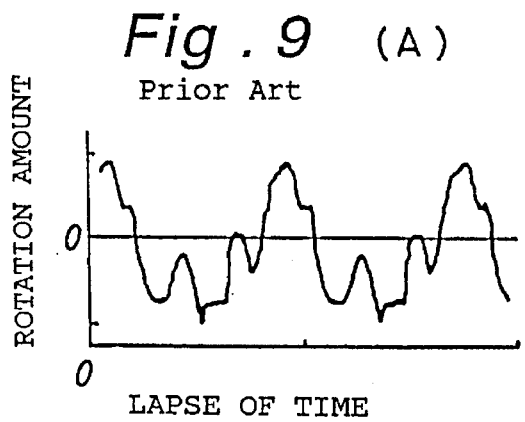
FIGS. 9(A) and 9(B) each are a graph representing fluctuation in rotation amount of a rack member about its axis line when applied with a steering effort from a pinion.
Figure 9:
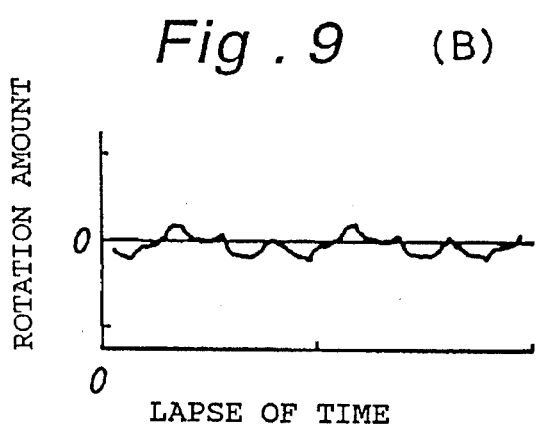
Figure 10:
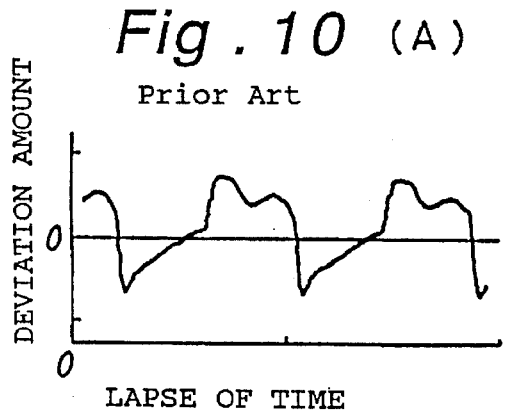
FIGS. 10(A) and 10(B) each are a graph representing fluctuation in deviation amount of the rack member in a direction of a spring biasing force applied thereto from a rack guide.
Figure 10:
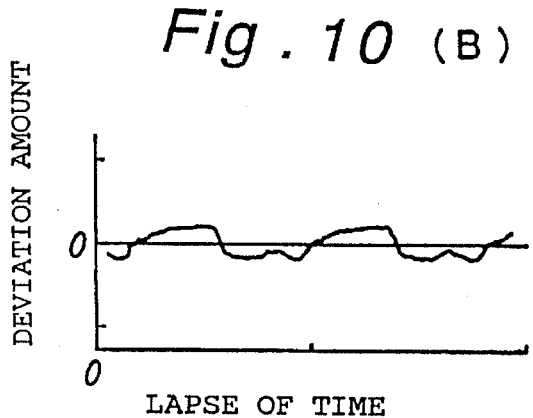
Figure 11:
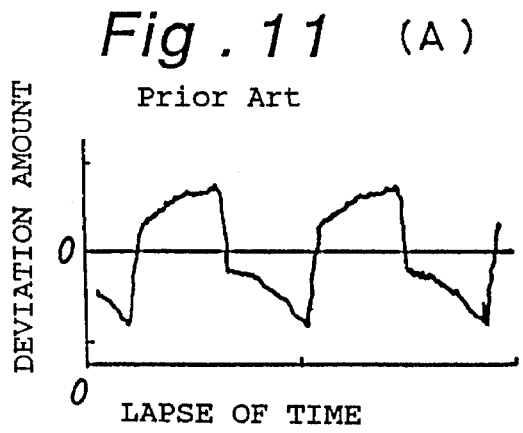
FIGS. 11(A) and 11(B) each are a graph representing fluctuation in deviation amount of the rack member in a tooth width direction.
Figure 11:
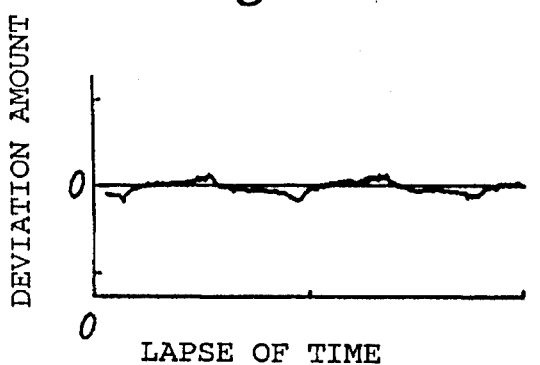
Figure 12:
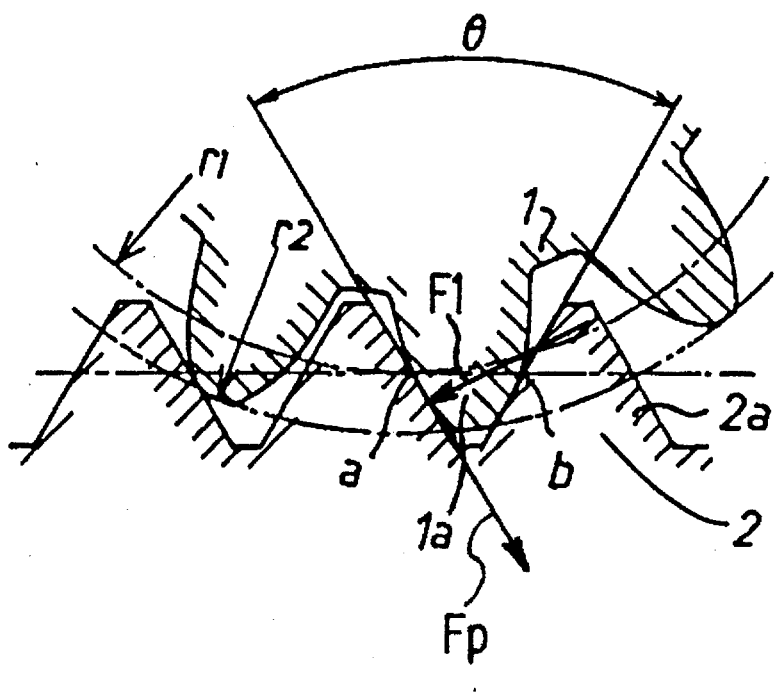
FIG. 12 is an enlarged sectional view of the meshed portion of a pinion and a rack member in a conventional steering gear apparatus.

In the above-described embodiment the construction of which is the same as the conventional steering gear apparatus except for the toothed portions 11a and 15a, unwanted looseness at the meshed portion can be reduced by the rolling frictional force Fp obtained by engagement of the tip portion 11a1 of the respective pinion teeth 11a with the root 15a1 of the respective rack teeth 15a. As a result, a clearance in a rotational direction of the pinion 11 can be formed at the meshed portion to effect sliding contact at one tooth flank in a tooth trace direction without causing sliding contact at two tooth flanks as in the conventional steering gear apparatus discussed above. This is effective to decrease a sliding frictional force caused by sliding contact at the engaged tooth flanks in the tooth trace direction. Thus, even if the rack member 15 is slightly rotated about its axis line or deviated from its axis line due to a counterforce acting against the sliding frictional force when applied with a rotational force from the pinion 11, the rotation or deviation of the rack member 15 can be greatly restrained in comparison with the conventional steering gear apparatus as shown in FIGS. 9(B), 10(B) and 11(B). This is useful to restrain deterioration of the steering performance.

Although in the above-described embodiment, the tooth tip circle radius r2 at the pinion teeth 11a has been determined to be the same as the pitch circle radius r1, the tooth tip circle radius r2 may be determined to be different from the pitch circle radius r1. In the case that the tooth tip circle radius r2 is larger than the pitch circle radius r1, lateral movement of the rack member 15 is accelerated in steering operation, and the tooth flank of the respective rack teeth 15a at its forward side is maintained in meshing engagement with the tooth flank of the respective pinion teeth 11a at their reverse rotation sides. Accordingly, even when the rotation of pinion 11 is suddenly stopped or inverted, any engagement noise of the tooth flanks does not occur. Even if the pinion 11 is applied with a counterforce from the rack member 15, noises caused by engagement of the tooth flanks can be reduced by the frictional force between the root 15a1 of the respective rack teeth 15a and the tip portion 11a1 of the respective pinion teeth 11a.

Although in the above-described embodiment, the root 15a1 of the respective rack teeth 15a has been formed to be brought into sliding engagement with the tip portion 11a1 of the respective pinion teeth 11a in the axial direction of rack member 15, the tip portion of the respective rack teeth 15a may be formed to be brought into sliding engagement with the root of the respective pinion teeth 11a in the axial direction of rack member 15. In this case, lateral movement of the rack member 15 is delayed by the rolling frictional force, and the backward side flank of the respective rack teeth 15a is maintained in engagement with the forward side flank of the respective pinion teeth 11a. Accordingly, even when the pinion 11 is applied with a counterforce from the rack member 15, any engagement noise of the flanks does not occur. Even if the pinion 11 is suddenly stopped or rotated in a reverse direction in steering operation, noises caused by engagement of the flanks can be reduced by a frictional force of the root 15a1 of the respective rack teeth 15a with the tip portion 11a1 of the respective pinion teeth 11a.

Figure 3:
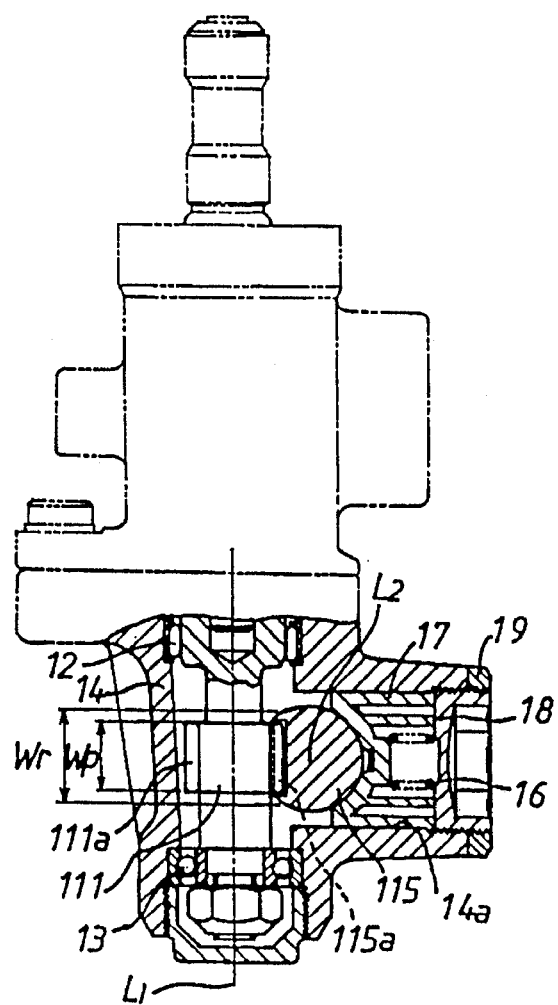
FIG. 3 is a partly sectional view of another embodiment of the present invention.
Figure 4:
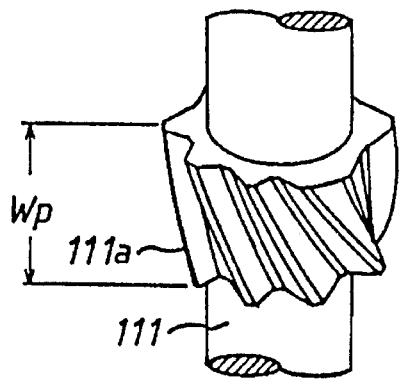
FIG. 4 is a perspective view of a pinion shown in FIG. 3.
Figure 5:
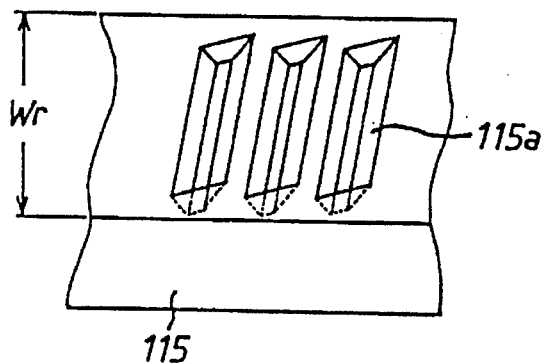
FIG. 5 is a perspective view of a portion of a rack member shown in FIG. 3.

Illustrated in FIGS. 3 to 5 is another embodiment of the present invention wherein width Wp of the toothed portion of a pinion 111 is formed smaller than width Wr of the toothed portion of a rack member 115. The toothed portion of pinion 111 is formed in its full width with helical teeth 111a, while the toothed portion of rack member 115 is formed with the corresponding teeth 115a in transcription for engagement with the helical teeth 111a without machining the opposite end portions thereof. The other construction is substantially the same as that of the steering gear apparatus shown in FIG. 1.

In the embodiment shown in FIGS. 3 to 5, the teeth 111a and 115a can be brought into engagement with each other at least at their opposite ends in the tooth width direction. Accordingly, even if the rack member 115 is slightly rotated about its axis line or deviated from its axis line due to a counterforce against a sliding frictional force caused by a sliding contact at its tooth flanks in the tooth trace direction, the rotation or deviation of the rack member 115 is reduced by an engagement frictional force caused at the opposite ends of the teeth 111a and 115a in the tooth width direction. This is effective to restrain deterioration of the steering performance.

Figure 6:
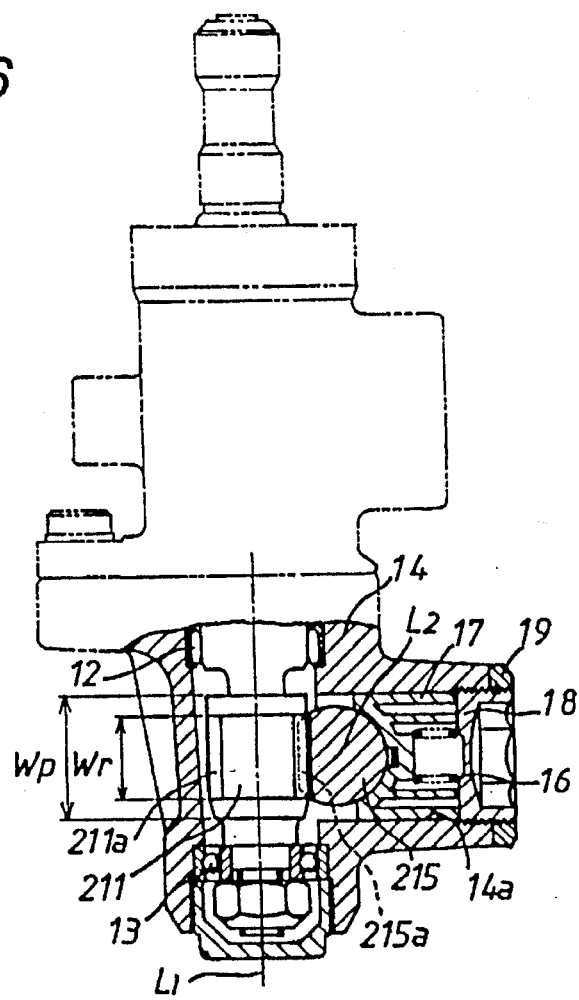
FIG. 6 is a partly sectional view of a modification of the embodiment shown in FIG. 3.
Figure 7:
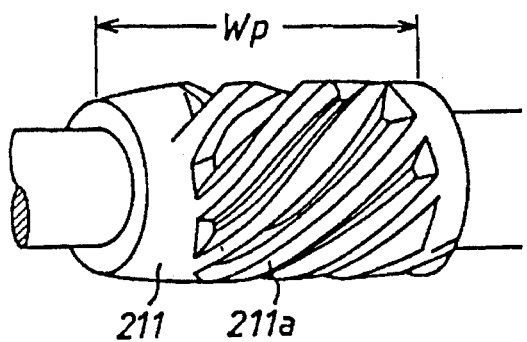
FIG. 7 is a perspective view of a pinion shown in FIG. 6.
Figure 8:
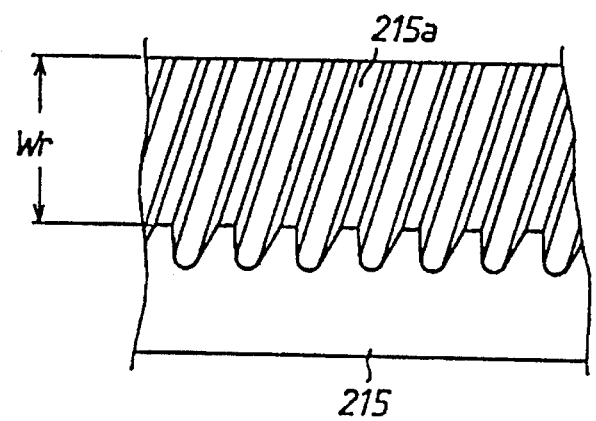
FIG. 8 is a perspective view of a rack member shown in FIG. 6.

Although in the above embodiment, the width Wp of the toothed portion of pinion 11 has been determined smaller than the width Wr of the toothed portion of rack member 115, the embodiment may be modified as shown in FIGS. 6 to 8. In this modification, the width Wp of the toothed portion of a pinion 211 is determined larger than the width Wr of the toothed portion of a rack member 215, and the toothed portion of rack member 215 is formed in its full width with helical teeth 215a while the toothed portion of pinion 211 is formed with the corresponding teeth 215a in transcription without machining at its opposite end portions. The other construction is substantially the same as that in the above embodiment.

Although in the above embodiments shown in FIGS. 3 to 5 and 6 to 8, the toothed portion smaller in width is formed in its full width with a plurality of teeth while the other toothed portion larger in width is formed with the corresponding teeth in transcription for full engagement with the teeth of the toothed portion smaller in width, the corresponding teeth of the toothed portion larger in width may be formed in transcription for partial engagement in depth with the teeth of the toothed portion smaller in width at least at their opposite ends in the tooth width direction.

What is claimed is:

1. A steering gear apparatus of the rack-and-pinion type including a pinion formed with a toothed portion, a rack member formed with a toothed portion which is brought into meshing engagement with the toothed portion of said pinion in such a manner that a steering effort is applied to the meshed portion of the toothed portions of said pinion and rack member at a predetermined angle relative to an axis line of said rack member, and resilient means for resiliently biasing said rack member toward said pinion, wherein each tooth of the toothed portion of said pinion or said rack member is formed with a tip portion to be brought into contact with a root of each tooth of the toothed portion of said rack member or said pinion.

2. A steering gear apparatus of the rack-and-pinion type as claimed in claim 1, wherein the toothed portion of said pinion is formed with a plurality of teeth while the toothed portion of said rack member is Formed with a plurality of helical teeth, and wherein each tooth of said pinion or each helical tooth of said rack member is formed with a tip portion to be brought into contact with each root of the helical teeth of said rack member or each root of the teeth of said pinion.

3. A steering tear apparatus of the rack-and-pinion type as claimed in claim 1, wherein the toothed portion of said pinion is formed with a plurality of helical teeth while the toothed portion of said rack member is formed with a plurality of helical teeth, and wherein the helical teeth of said pinion or said rack member each are formed with a tip portion to be brought into contact with each root of the helical teeth of said rack member or said pinion.

* * * * *